US 7,693,861 B2

(12) United States Patent
Mital et al.

(10) Patent No.: US 7,693,861 B2
(45) Date of Patent: Apr. 6, 2010

(54) SCHEMATIZATION OF ESTABLISHING RELATIONSHIPS BETWEEN APPLICATIONS (75) Inventors: Vijay Mital, Sammamish, WA (US); Wolfgang Werner Hilpert, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 11/167,969

(22) Filed: Jun. 28, 2005

(65) Prior Publication Data
US 2006/0294197 A1    Dec. 28, 2006

(51) Int. Cl.
G06F 17/00    (2006.01)
G06F 15/16    (2006.01)

(52) U.S. Cl. .............................. 707/102; 705/1; 705/8; 705/9; 707/608

(58) Field of Classification Search ........................ None
See application file for complete search history.

(56) References Cited

U.S. PATENT DOCUMENTS

| | | | |
|---|---|---|---|
| 5,774,661 | A | 6/1998 | Chatterjee et al. |
| 6,088,679 | A | 7/2000 | Barkley |
| 6,225,998 | B1 | 5/2001 | Okita et al. |
| 6,411,961 | B1 | 6/2002 | Chen |
| 6,621,505 | B1 | 9/2003 | Beauchamp et al. |
| 6,662,188 | B1 | 12/2003 | Rasmussen et al. |
| 6,708,186 | B1 | 3/2004 | Claborn et al. |
| 6,898,790 | B1 | 5/2005 | Cheong et al. |
| 7,020,618 | B1 * | 3/2006 | Ward .............................. 705/8 |
| 7,233,952 | B1 | 6/2007 | Chen |
| 7,496,628 | B2 | 2/2009 | Arnold et al. |
| 2002/0040312 | A1 | 4/2002 | Dhar et al. |
| 2002/0184610 | A1 | 12/2002 | Chong et al. |
| 2003/0084016 | A1 | 5/2003 | Norgaard et al. |
| 2003/0084127 | A1 | 5/2003 | Budhiraja |
| 2003/0097286 | A1 | 5/2003 | Skeen |
| 2003/0220707 | A1 | 11/2003 | Budinger et al. |
| 2004/0133876 | A1 | 7/2004 | Sproule |

(Continued)

FOREIGN PATENT DOCUMENTS

EP    0895169    2/1999

(Continued)

OTHER PUBLICATIONS

Maurer, Frank et al., Merging Project Planning and Web-Enabled Dynamic Workflow Technologies, IEEE Internet Computing, Jun. 2000, pp. 65-74, XP002345613, ISSN: 1089-7801, IEEE Service Center, Piscataway, NJ, US.

(Continued)

Primary Examiner—Cam Y Truong
Assistant Examiner—Dung K Chau
(74) Attorney, Agent, or Firm—Senniger Powers LLP (57) ABSTRACT Establishing relationships between one or more entities of a first application and one or more entities of a second application using metadata. At least one entity of the second application is identified for establishing a relationship with at least one entity of the first application. Metadata from the second application is received at the first application. The metadata includes information associated with the identified entity of the second application. An expression is generated, based on the metadata, specifying a relationship between the entity of the first application with the identified entity of the second application.

15 Claims, 7 Drawing Sheets

U.S. PATENT DOCUMENTS

| | | |
|---|---|---|
| 2004/0148213 A1 | 7/2004 | Aziz et al. |
| 2004/0153350 A1 | 8/2004 | Kim et al. |
| 2004/0162741 A1 | 8/2004 | Flaxer et al. |
| 2004/0176968 A1 | 9/2004 | Syed et al. |
| 2004/0181775 A1 | 9/2004 | Anonsen et al. |
| 2004/0220910 A1 | 11/2004 | Zang et al. |
| 2004/0230404 A1 | 11/2004 | Messmer et al. |
| 2004/0260593 A1* | 12/2004 | Abraham-Fuchs et al. ..... 705/8 |
| 2005/0050311 A1 | 3/2005 | Joseph et al. |
| 2005/0071347 A1 | 3/2005 | Chau et al. |
| 2005/0216482 A1 | 9/2005 | Ponessa |
| 2005/0262112 A1* | 11/2005 | Moore .................. 707/100 |
| 2006/0053120 A1 | 3/2006 | Shum et al. |
| 2006/0069596 A1* | 3/2006 | Hatoun et al. ............. 705/7 |
| 2006/0069605 A1* | 3/2006 | Hatoun .................. 705/9 |
| 2006/0143034 A1* | 6/2006 | Rothermel et al. ......... 705/1 |
| 2006/0143193 A1 | 6/2006 | Thakkar et al. |
| 2006/0241997 A1* | 10/2006 | Bhatawdekar et al. ....... 705/9 |
| 2006/0277166 A1* | 12/2006 | Vogler-Ivashchanka et al. 707/3 |
| 2008/0120283 A1 | 5/2008 | Liu et al. |
| 2008/0301175 A1 | 12/2008 | Applebaum et al. |

FOREIGN PATENT DOCUMENTS

| | | |
|---|---|---|
| EP | 0953929 A2 | 11/1999 |
| WO | 0054202 A | 9/2000 |
| WO | WO 0060456 | 10/2000 |
| WO | WO 2004114061 | 12/2004 |

OTHER PUBLICATIONS

Abhay Parasnis, Session Code: DAT321—Datay Systems—BizTalk Orchestration Engine Futures, Microsoft Professional Developers Conference 2003, Online!, Oct. 27, 2003-Oct. 30, 2003, pp. 1-26, XP002360567, Los Angles, CA, USA http://only4gurus.com/v3/downloadcount.asp?id=421>, retrieved on Dec. 21, 2005.

Marshak R T, IBM's Flowmark Object-Oriented Workflow for Mission-Critical Applications, Workgroup Computing Report, May 1, 1994, pp. 3-13, vol. 17, No. 5, XP00056899, ISSN: 1057-8889.

"Vitria: BusinessWare™ The Leading Platform for Agile Business Process Integration," http://64.233.161.104/search?q=cache:Uuj3DTUu4McJ:www.vitria.com/products/platform+BusinessWare+Vitria&hl=en, printed Jun. 28, 2005, 2 pages, USA.

Abbott, "Experiences with workflow management: issues for the next generation," http://portal.acm.org/citation.cfm?id=192886, Oct. 1994, 8 pages, USA.

Sarin, "Workflow and Data Management in InConcert," http://portal.acm.org/citation.cfm?id=645481.655603&hl=en, Feb. 1996, 3 pages, USA.

V.R. Basili, L.C. Briand, W.M. Thomas, "Domain Analysis for the Reuse of Software Development Experiences", Proceedings 19th Soft. Eng. Workshop, NASA/GSFC, Greenbelt, MD, Dec. 1994, 14 pages, USA.

Perkins,Alan,"Business Rules = Meta-Data," In: Proceedings of the Technology of Object-Oriented Languages and Systems, 2000, pp. 285-294.

* cited by examiner

SCHEMATIZATION OF ESTABLISHING RELATIONSHIPS BETWEEN APPLICATIONS

BACKGROUND

Business workflow or process-oriented software applications are often used to manage how different entities with organizational roles (e.g., persons or individual) interact with various tasks such as in workflow processes. For example, in a typical purchase order fulfillment workflow process, an order fulfillment clerk may be responsible for receiving the order from a customer; a manager of the customer's region may be in charge of approving the order; an inventory manager may have the duty to identify the availability of the ordered product; and a shipping department manager processes the shipment of orders. In many instances, any individual in the same role, such as a manager, may perform the task. However, business workflow software applications need to resolve situations where a specific individual of a specific role must perform a particular task. For example, an expression such as "this.customer.region.manager" requires an identification of the individual who is entitled to play the role for this particular workflow instance.

While the workflow application may specify different entities or actors (e.g., the order fulfillment clerk, the sales manager, or the like) for performing a task, information relating to each of these entities may be managed by another system, such as a personnel directory managing system or a directory data source. Such personnel management system or data source includes personnel role information, including personnel access restrictions, task assignment rights and privileges, task delegation rights, and the like.

Currently, the workflow application and the personnel management system do not interact with each other efficiently such that the workflow application has information relating to entities of the personnel management system or a data source. For example, a workflow process definer, or modeler, who defines an order management process may wish to ensure that a particular task "must be approved by a second level manager of the initiator of this process instance." Suppose a purchase order process is initiated by a fulfillment clerk, and that there are four different departments in the organization, each with a different organizational hierarchy maintained by the personnel management system. Within each department, the second level manager of the fulfillment clerk may be a different person and may perform a task specific to the department. For example, a second level manager in the sales department may "approve" an order initiated by a sales fulfillment clerk while a second level manager in the accounting department does not "approve" but rather "supervises" an accounting fulfillment clerk's tasks. Consequently, the workflow process definer in this example is required to statically specify a separate role-task logic to each department.

As illustrated in the example above, in addition to requiring knowledge of relationships, conventional workflow applications and other business systems need to resolve role definitions within the relationships of the personnel management system. For example, role definitions include references to information such as relationships between personnel and business entities and entities in the workflow system itself. The example "this task must be approved by the manager of the region in which this customer is situated", which may be expressed as "this.customer.region.manager", illustrates that the role resolution requires both the entities known to the workflow (i.e., "this customer") and the relationships that are known only to personnel and business systems (i.e., what region does this customer reside it, and who is the region manager).

Some workflow applications and personnel role management software applications interact with one another to establish relationships between the entities of the workflow applications and personnel role management software applications. However, it is required that both sets of applications are manufactured or designed by the same manufacturer. In other words, information relating to relationships among entities or personnel hierarchy structure is unavailable to a third party workflow software.

Other directory access software or protocols attempt to make role information available from the role management software application. In addition, such directory access software may retrieve and access basic information (e.g., first name, last name, or the like) from online phone books across platforms. These attempts, however, are inefficient and fall short of providing information about how people are associated with non-people entities like regions (manager of region) and products (designer of this product). Without being able to access to this information, it is difficult for developers to establish relationships between roles and entities in the workflow management application and roles and entities in other applications in the business.

In addition, even when the information relating to entities is available (e.g., via generic access such as open database connectivity (ODBC), integration adapter methods, Web Service operations, and custom APIs), the burden of creating business role expressions falls heavily on the developer who implements the process per the developer's higher-level model diagrams and instructions. Using the example above, in order to design the task "must be approved by a second level manager of the customer's region of an initiator of this process instance", a workflow process definer is required to resolve relationships between "second level", "manager", "initiator", and the "manager of the customer's region". Currently, not only is such relationship information unavailable; even if available, the information does not expose methods to help the definer reduce the burden in creating business role expressions.

Also, current systems and implementations are deficient and lack flexibility because the defined complex business role expressions are unique and specific to the particular business role expression. Thus, different definers, while defining a role expression for a similar or identical relationship as another definer, may not use the same role expression as another definer because different definers in different domains write code for the same purpose/task very differently. Moreover, the readability of the current process model is low as there is no uniformity in designing and defining role expression. To a non-technical user of a workflow process application, attempting to understand proper relationships between entities from arbitrarily crafted rules or codes further complicate the matter.

SUMMARY

Embodiments of the invention use extensible metadata including information relevant to establishing a relationship between entities of a workflow application and another application or a data source. By obtaining or receiving the metadata, a business role expression may be generated such that relationship information of entities, such as person to person, person to non-person entities, role to role, role to entity, or the like, is available to the workflow application and that workflow application may correctly operate knowing the proper relationships between entities and workflow processes. In another aspect of the invention, using this metadata schematization makes integration of information of entities' relationships available to distributed systems (such as, web services or standardized protocols) so that it reduces the burden on process role builders or definers to multiple business role expressions unique for one entity or process.

Alternatively, the invention may comprise various other methods and apparatuses.

Other features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
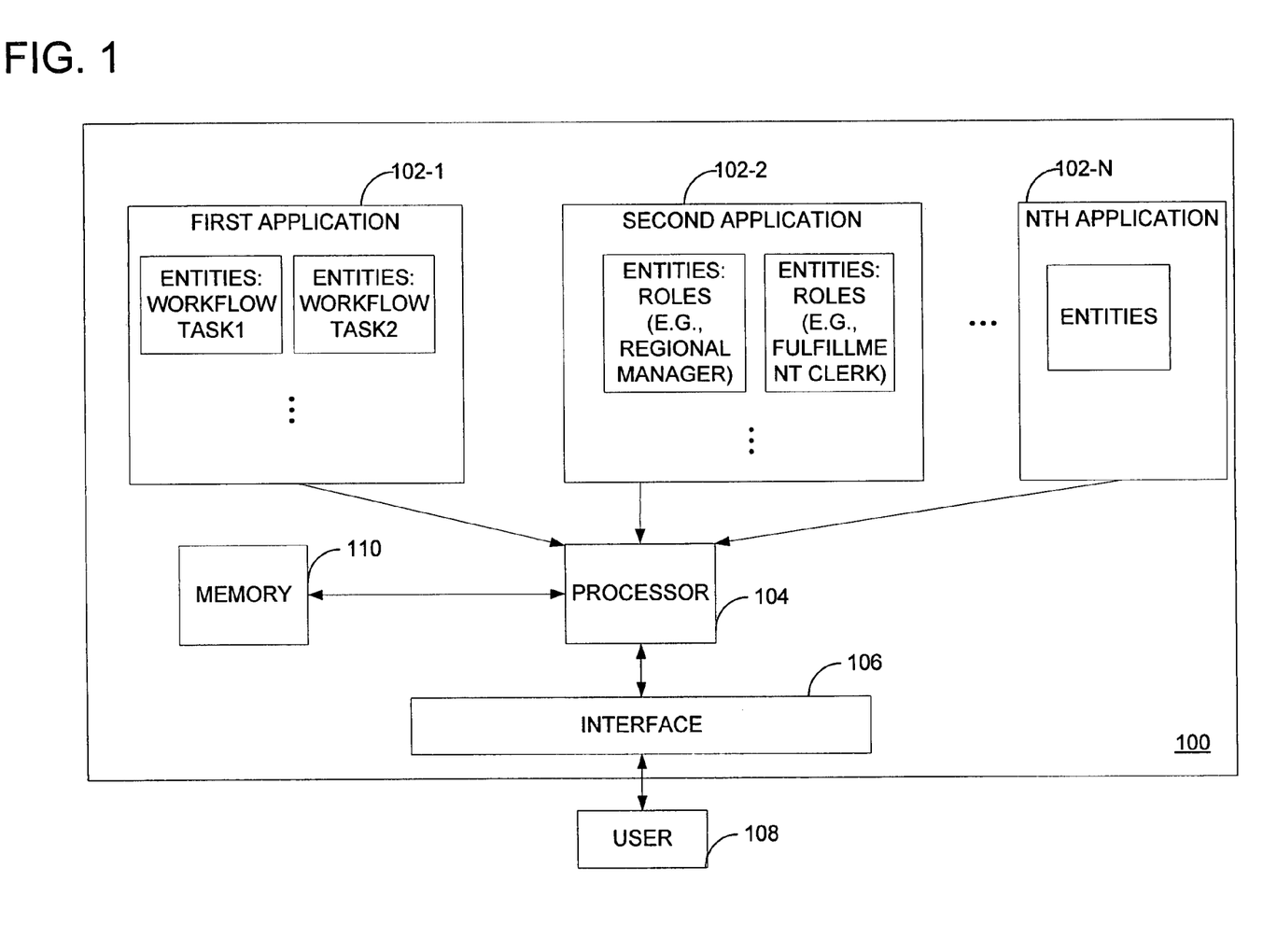
FIG. 1 is a block diagram illustrating a system for establishing relationships between one or more entities of a first application and one or more entities of a second application according to an embodiment of the invention.

Referring first to FIG. 1, a block diagram illustrates a system 100 for establishing relationships between one or more entities of a first application 102-1 and one or more entities of a second application 102-2 according to one embodiment of the invention. For example, the system 100 may be a computing system such as a computer 130 in FIG. 6, a computing device, a computer server, a plurality of computer servers, or other computing device that is capable of executing computer-executable instructions, applications 102, application software, computer-executable routines or codes. In another embodiment, system 100 includes computing devices in a distributed system in which the computing devices are connected by a common communication network, such as an intranet, an internet, or the like.

The applications 102 include the first application 102-1 and, the second application 102-2 to Nth application 102-N. As an example, the first application 102-1 may be a workflow application program including various workflow tasks, and the second application 102-2 may be a data store or application such as a customer relationship management (CRM) application, personnel directory, or the like. The second application 102-2 may include data relating to entities. Such data may include a class of data that may be a source of many relationships or a target. Exemplary entities include customers, employees, products, documents, and individuals who perform a task.

Figure 2:
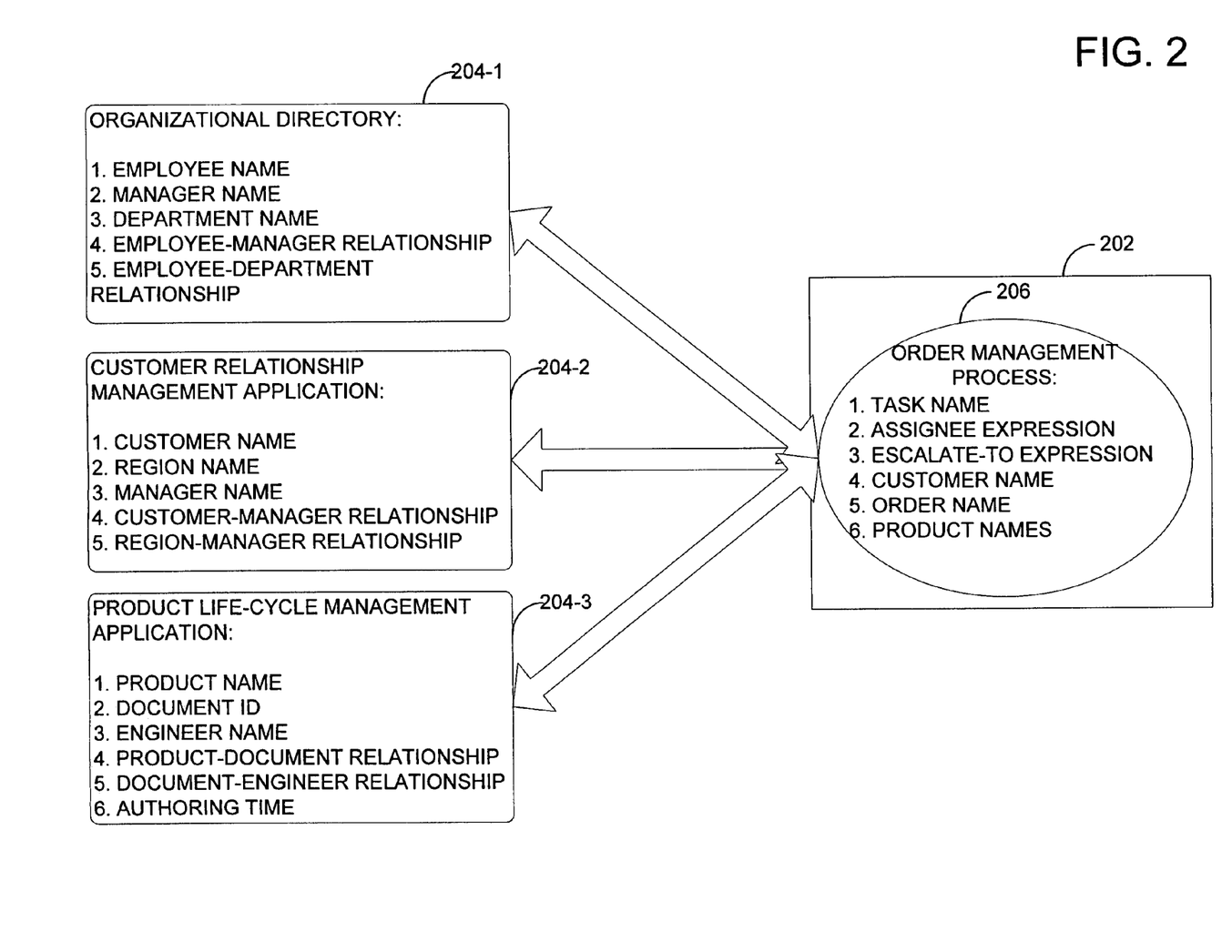
FIG. 2 is a block diagram illustrating first applications and second applications according to an embodiment of the invention.

As an illustration, FIG. 2 is a block diagram describing an exemplary first application 202 and exemplary second applications 204 according to one embodiment of the invention. For example, the first application 202 may be a workflow process application including an order management workflow process 206, which includes entities such as task name, assignee expression, escalate-to expression, customer name, order name, and/or product names in order to have the process 206 performed.

Similarly, the second applications 204 include an organizational directory data store 204-1, a CRM application 204-2, and a product life-cycle management application 204-3. However, each of the second applications 204 may define different relationships between entities within its hierarchical structure from others. For example, in the organizational directory data store 204-1, an employee has a manager, and a manager may in turn have another manager. Therefore, according to this example, it is valid to think of relationships between entities as: "manager-of-manager-of-<role>" (e.g., person P). Similarly, the CRM application 204-2 includes relationships between its entities, but the relationships are not hierarchical. For example, a manager may be in charge of overseeing a region, but the relationship of an expression such as "a Manager of a Region of a Region", or "a Manager of a Manager of a Region" does not represent a logical relationship in this application 204-2. Likewise, the product life-cycle management application 204-3 includes some hierarchical relationships but there is non-relationship information associated with a relationship. For example, an engineer may author a document, and within such a relationship, there is a time dimension or time limitation. Such time limitation may be treated as a qualifier to end the relationship, i.e., the relationship between the engineer and the document may exist only within such time limitation. At the same time, such time limitation may also start a relationship. For example, document A may be authored by engineer A before engineer B.

Therefore, in order to seamlessly interact with second applications 204, the process 206 of first application 202 may wish to know the relationships between the entities within second applications 204 so that a user of first application 202 may properly design a logical workflow process to interact with entities of second applications. Embodiments of the invention establish relationships between one or more entities of first application 202 and one or more entities of second applications 204 by receiving, at first application 202, metadata from second applications 204, the metadata including information associated with the identified entities of second application 204. For example, metadata may include business role information such as role access permission, role access privileges, role type, role limitations, role-to-role relationships, or the like. Additionally, metadata may include business entity information, including information pertaining to a business entity hierarchy (e.g., entity hierarchical structure, entity command structure, or the like) or information pertaining to a relationship graph (e.g., non-hierarchical relationship structure or the like).

After receiving the metadata from second applications 204, embodiments of the invention generate, based on the metadata, an expression specifying a relationship between the entities of the first application with the entity of the second application. For example, in composing or defining the process 206, a user of first application 202 may wish to express the process 206 as "This.Task IsAssignedTo <BusinessRole-Expression>" or "This.Task IsDelegatedTo <BusinessRole-Expression>". Through the generated expression, the user of first application 202 may properly and suitably create a workflow process that not only fits the entities' hierarchical structure but also complies with necessary limitations in interacting with the entities. Such generated expression creates ease of understanding the relationships between entities among applications and promotes a uniform format of the expression. In this manner, the generated expression may be flexible, re-usable and yet relatively easy to define and reuse the expression handling complex workflow processes among applications.

In an alternative embodiment, first application 202 and second applications 204 expose information about relationships between entities as metadata (to be discussed in Tables 1 and 2 and FIG. 5) such that first application 202 and second applications 204 may access and obtain information relating to relationships between entities of first application 202 and second applications 204.

Table 1 describes exemplary metadata entries exposed or to be collected from a second application 204 such as CRM application 204-1:

In line 3 of Table 1, the metadata describes a region entity. According to Table 1, the region entity is not an actor (i.e., IsActor="false"). Similar to entity reference value, the region entity has an entity reference value of "ER2".

In addition to information relating to entity type, the metadata also includes information associated with relationships between entities of the second application in lines 5-8 in Table 1. In this example, a relationship called "RegionManager" describes a relationship between an employee entity and a region entity. As described, this relationship is unidirectional (see line 8<Reference FromRole="EmployeeRole" ToRole="ManagerRole">. The metadata also provides that this relationship cannot be meaningfully composed with another relationship of the same type.

Still referring to Table 1, metadata in lines 9-13 describes an employee to employee relationship called "manager". While this relationship is also unidirectional, the metadata indicates that this relationship can be meaningfully composed with another relationship of the same type (i.e., IsComposable="true").

It is to be understood that the metadata format provided in Table 1 is for exemplary purposes and does not limit embodiments of the invention. For example, a common or frequently used metadata format, such as XML tags or the like may be used without departing from the scope of the invention. In addition, while examples in Table 1 only illustrate one relationship between entities in the second application, metadata of one or more relationships between one or more entities of the same type, between one or more entities of different types,

TABLE 1

Exemplary metadata included in business applications

| Line number | Metadata |
|---|---|
| 1 | <Entities> |
| 2 | <Entity EntityType="Employee" IsActor="true" EntityReference="ER1" /> |
| 3 | <Entity EntityType="Region" IsActor="false" EntityReference="ER2" /> |
| 4 | </Entities> |
| 5 | <Relationship Name="RegionManager"> |
| 6 | <End Role="EmployeeRole" Type="Employee" Multiplicity="*" /> |
| 7 | <End Role="RegionRole" Type="Region" Multiplicity="1" /> |
| 8 | <Reference FromRole="EmployeeRole" ToRole="RegionRole" RelationshipReference="RR1" IsCommutative="false" IsComposable=false"/> |
| 9 | <Relationship Name="Manager"> |
| 10 | <End Role="ManagerRole" Type="Employee" Multiplicity="*" /> |
| 11 | <End Role="EmployeeRole" Type="Empolyee" Multiplicity="1" /> |
| 12 | <Reference FromRole="EmployeeRole" ToRole="ManagerRole" RelationshipReference="RR2" IsCommutative="false" IsComposable="true"/> |

For example, in line 2 of Table 1, metadata includes information that indicates this entity is an "Employee" entity. Also, the "Employee" entity is capable of being an "Actor", an type of entity that is capable of performing a task in a business process. In one embodiment, this "Employee" entity has an entity reference of "ER1" such that entities may be shared using this entity reference value. For example, all orders handled by the same employee would have the same value for the entity reference. At the same time, when referencing the entity reference by entering a query for "ER1", system 100 would return information about name of the employee who has the entity reference value "ER1".

or within the same entity type may be defined by the second application without departing from the scope of the invention.

In an alternative embodiment, metadata in the second application may include information such as relationships between an entity in one business application and another entity in another business application.

In another alternative embodiment, processes or tasks of the first application 202 may also expose or cause to be collected metadata including information associated with entities of the first application. Table 2 describes exemplary metadata including information associated with a workflow process:

TABLE 2

Metadata for processes

| Line number | Metadata |
| --- | --- |
| 14 | <Entities> |
| 15 | <Entity EntityType="Product" IsActor="false" EntityReference="PER1" /> |
| 16 | <Entity EntityType="Region" IsActor="false" EntityReference="PER2" /> |
| 17 | </Entities> |
| 18 | <ProcessActors> |
| 19 | <ProcessActor TaskId="222" ActorType="Assignee"> |
| 20 | <BusinessRoleExpression ExpressionId="EID1" /> |
| 21 | </ProcessActor> |
| 22 | <ProcessActor TaskId="222" ActorType="Escalatee"> |
| 23 | <BusinessRoleExpression ExpressionId="EID2" /> |
| 24 | </ProcessActor> |
| 25 | </ProcessActors> |

In the above example in lines 14-17, metadata from the process describes information about a product and a region. For example, according to the metadata, the "product" entity is not an actor entity that may perform a task. The metadata also indicates that the product has an entity reference value of "PER1". Similarly, a region entity of this process is also not an actor and has an entity reference value of "PER2".

In one embodiment, metadata in lines 18-21 describes any previously defined or generated expression associated with this process. In this example illustrated by Table 2, an actor "assignee" is associated with an instance ("TaskId='222'") of the process. In line 20, this actor "assignee" is associated with an expression "EID1". In other words, in task ID "222", the product with entity reference value "PER1" has been assigned to an "assignee" in the region with entity reference value "PER2". Similarly, metadata in lines 22-25 indicates that, also in task ID "222," the same product has been escalated by an "escalatee" for the region with entity reference value "PER2."

As such, in an alternative embodiment, the generated expression is represented in metadata of a process to describe a given expression establishes a relationship between a process (e.g., process 206) of first application 202 and an entity (e.g. an employee or manager in the CRM application) of second applications 204.

In a further embodiment, metadata relating to entities of first application includes information relating to whether a particular relationship type can be composed with another relationship of the same type. For example, the business entity hierarchy or relationship graph information of the metadata may include information to traverse through an organizational hierarchy or a business relationship graph (e.g. "sub-contractor of sub-contractor of x"). In yet another alternative embodiment, metadata may include information associated with whether a particular relationship type can be restricted or qualified along some generic dimension or continuum, e.g. time, dollar amount, or other metrics values defined by the first application and the second application.

It is to be understood that applications, software, or programs other than a workflow process applications may be treated as first application 202 in establishing relationships with second applications 204 without departing from the scope of the invention. Also, applications including data stores, data warehouse, or the like may be treated as second applications 204 without departing from the scope of the invention.

Referring again to FIG. 1, system 100 includes a processor 104 associated with an interface 106. The processor 104 processes instructions or commands from a user 108 via the interface 106 and executes computer-executable instructions, routines, applications, application programs, or the like. The interface 106 receives instructions from the user 108 to identify at least one entity of second applications 204 for establishing a relationship with at least one entity of the first application 202 (such as the user defining the process 206). In one embodiment, interface 106 receives, at the first application, metadata from the second application, said metadata-including information associated with the identified entity of the second application; In another embodiment, the interface 106 may be a display, such as the display shown in FIG. 6, and the user 108 may use an input device, such as a mouse 182 or a keyboard 180, to select or identify one or more entities of first application 202 displayed on the display.

Figure 6:
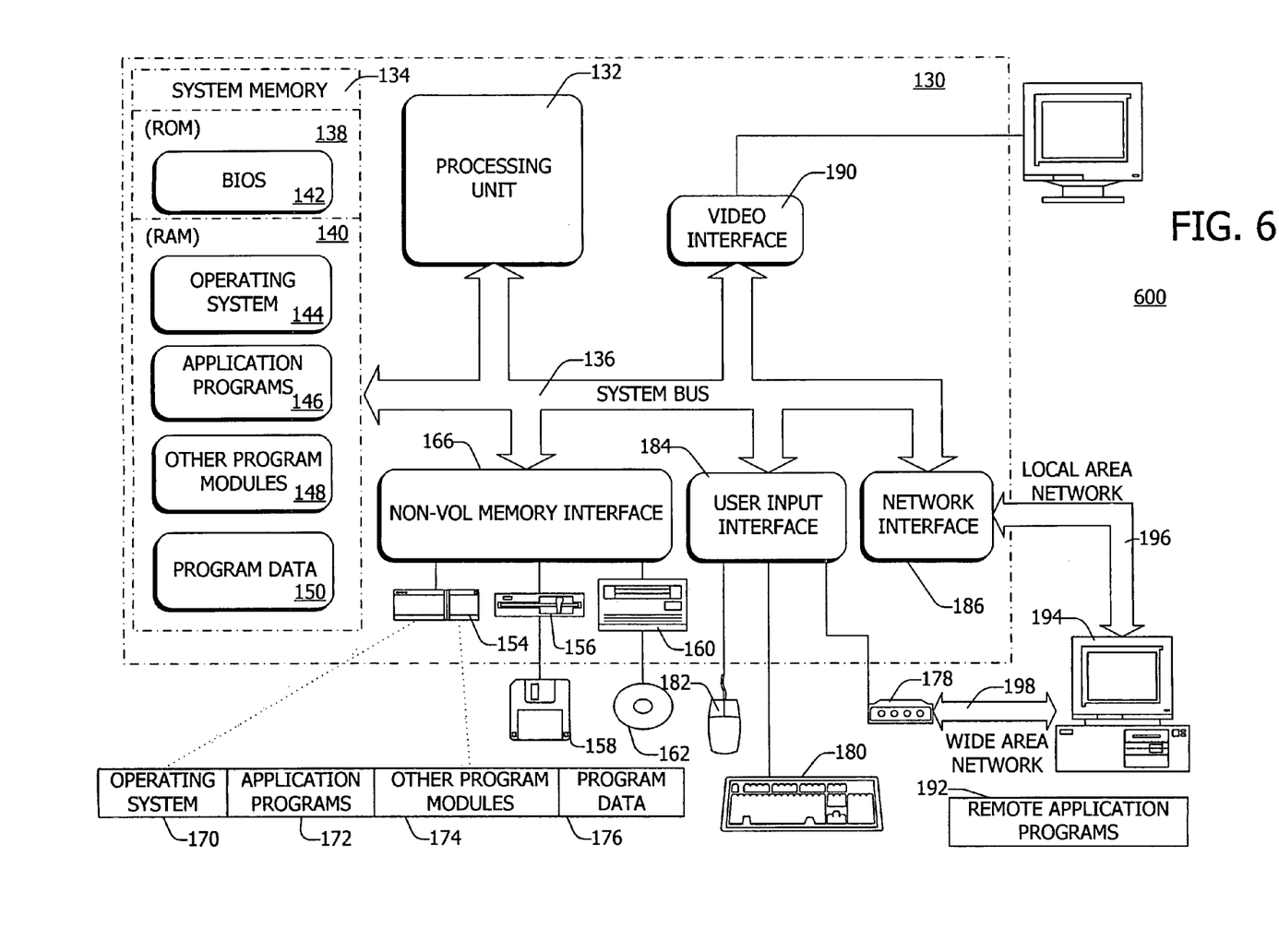
FIG. 6 is a block diagram illustrating an example of a suitable computing system environment in which the invention may be implemented.

The system 100 also includes a memory 110 which may be a volatile, non-volatile, a system memory 134 or a non-volatile memory interface 166 of FIG. 6, or other computer-readable medium for storing data that may be transmitted across a common communication network, such as an internet, an intranet, or other types of communication networks. The memory 110 stores metadata received from second applications 204.

Still referring to FIG. 1, processor 104 generates the expression, based on the metadata. The expression specifies a relationship between the entities of the first application 202 with the entities of the second applications 204. For example, processor 104 identifies the business role information and the business entity hierarchy or relationship graph information of the identified entity of the second application and associates the identified information with the entity of the first application.

Figure 3A:
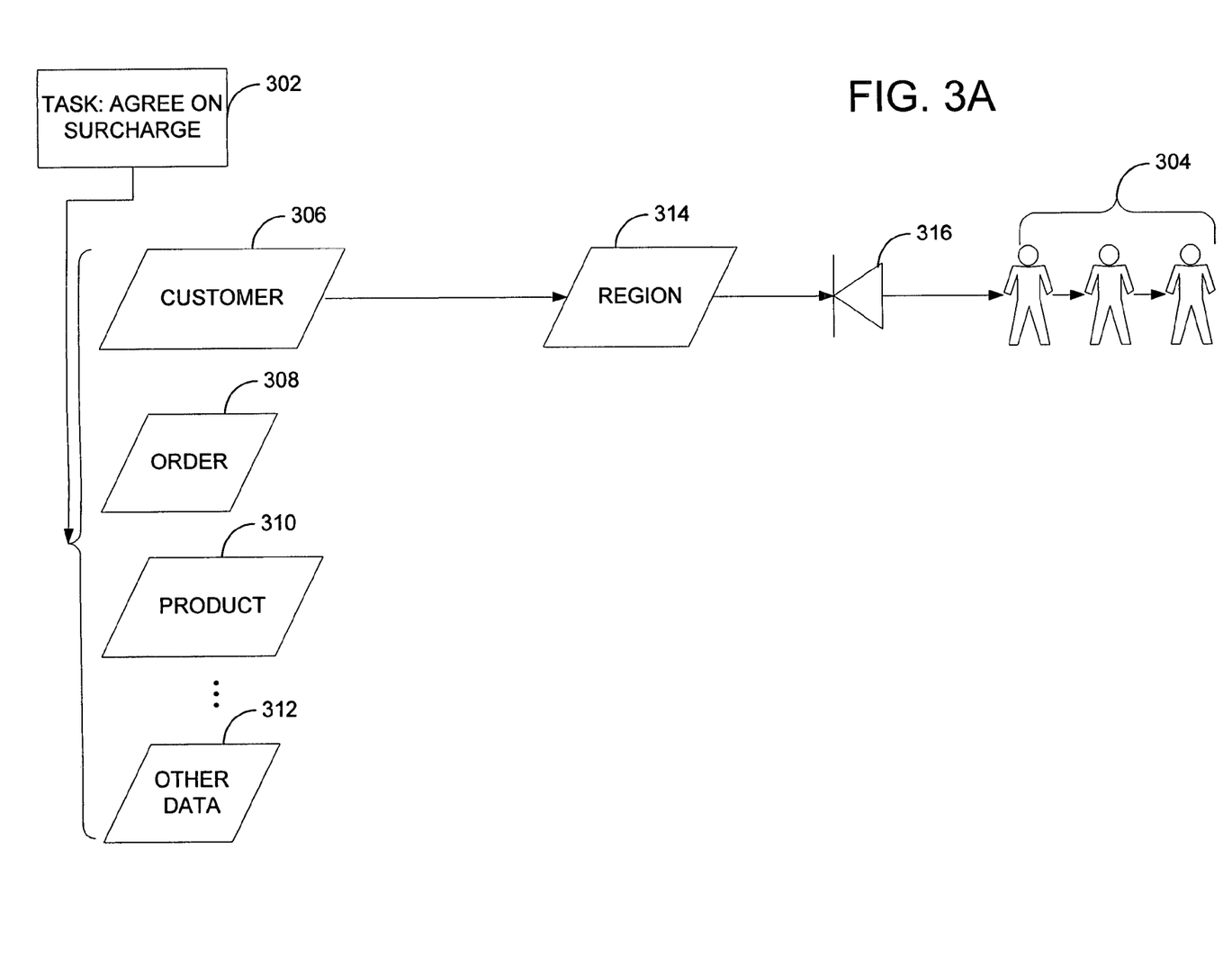
FIGS. 3A-3B are exemplary block diagrams illustrating an example of generating an expression based on metadata including information from the second application according to an embodiment of the invention.
Figure 3B:
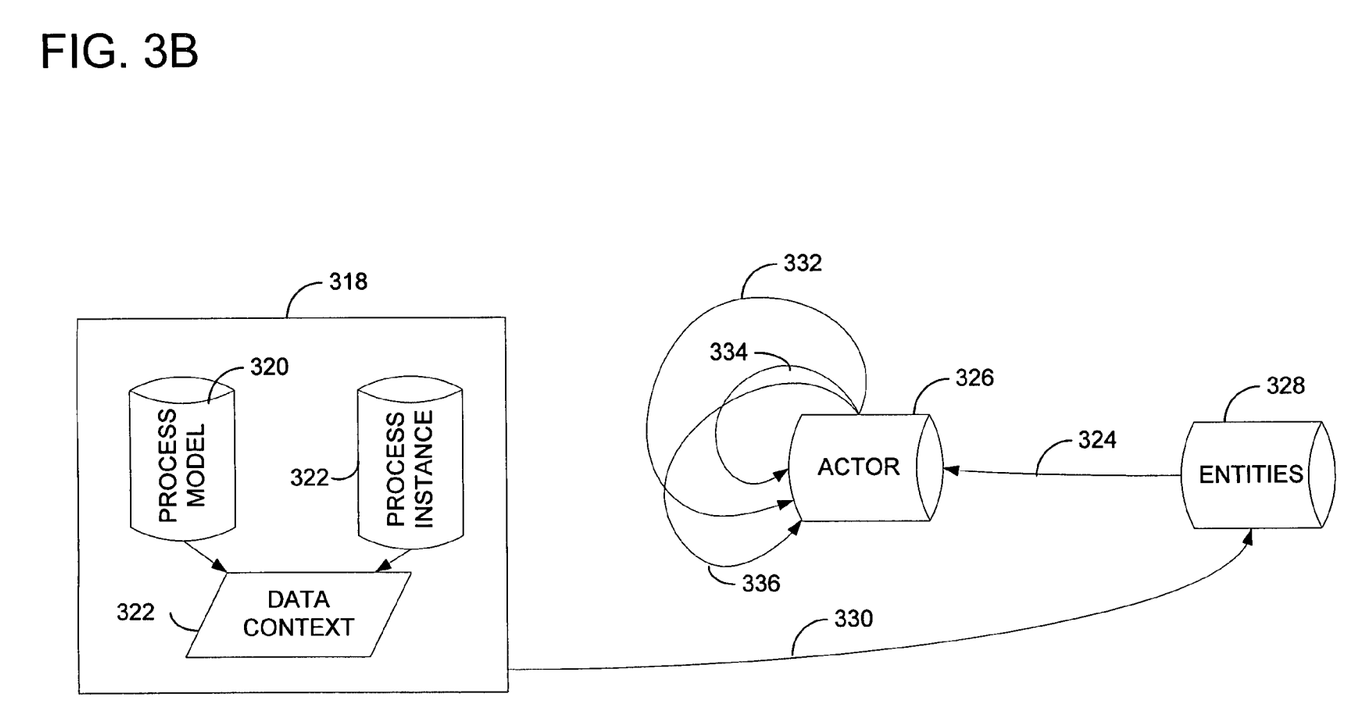

FIGS. 3A and 3B are exemplary block diagrams illustrating an example of generating an expression based on metadata including information from the second application according to one embodiment of the invention. In particular, FIG. 3A illustrates system 100, which generates an expression for an entity, such as a task 302, identified by a user to be performed by an actor 304 to "Agree on Surcharge" based on metadata from a CRM application and a product life-cycle management application. In this example, entity data such as a customer 306, an order 308, a product 310 or other data 312 are available to the task 302. Out of this available data, the system 100 identifies the customer 306 as relevant to the identified task 302. As such, metadata from customer 306 entity is received. The metadata of customer 306 may include information such as a region 314 where the customer is located, or other information similar to that shown in Table 1.

Further, from the region information in the metadata of customer 306, one or more managers may have relationships with the region as defined within CRM application 204-2 (FIG. 2) and one or more managers may be filtered by condition 316 to determine a desired subset of these managers 304. In this example, it is determined that the actor 304 is the third level manager of this region's manager. As such, by identifying the information from metadata of customer 306, the system 100 generates an expression "process.customer-.region.regionalmanager.manager.manager.manager" to establish one or more relationships between the task 302 and one or more entities of second applications.

FIG. 3B is a block diagram illustrating a further example of an expression generated from metadata of the second application. In one embodiment, the system 100 may propose a relationship through the generated expression based on the metadata. In another embodiment, the system 100 provides the generated expression to the user 108 through interface 106 such that user 108 may create new relationships between entities of the first application and the second application. For example, a process 318 metadata or data including information such as a process model 320, a process instance 322, and a data context 324. A second application may include metadata having information about an actor 326 and one or more entities 328. Arrows in FIG. 3B are further described in Table 3 below:

| Arrow in FIG. 3B | Metadata Usage | Remarks |
| --- | --- | --- |
| 330 | Customer -> Region | Use Customer from process data context to query CRM application for Region of customer |
| 324 | Region -> RegionalManager | Use region of customer to retrieve regional manager from CRM application applying the filter for regions within state of WA |
| 332 | RegionalManager -> Manager | Use Regional Manager to retrieve $1^{st}$ level manager from HR directory application |
| 334 | Manager -> Manager | Use $1^{st}$ level manager to retrieve $2^{nd}$ level manager from HR directory application |
| 334 | Manager -> Manager | Use $2^{nd}$ level manager to retrieve $3^{rd}$ level manager from HR directory application applying the filter, that resulting manager is VP level or higher. If not: continue to retrieve next level manager until VP level |

For example, a generated expression may include information derived from, arrow 332 about a customer and a region including the customer as: "Use Customer from process data context to query CRM application for Region of customer". Similarly, a generated expression may include information derived from metadata indicated by arrow 334, which describes the relationship between the actor entity 326 and other entities 328, in addition to the information received from arrow 332, as: "Use region of customer to retrieve regional manager from CRM application applying the filter for regions within state of Washington." As such, embodiments of the present invention propose possible relationships between the entities of the first application and the entities of the second application through the received metadata from the second application.

Figure 4:
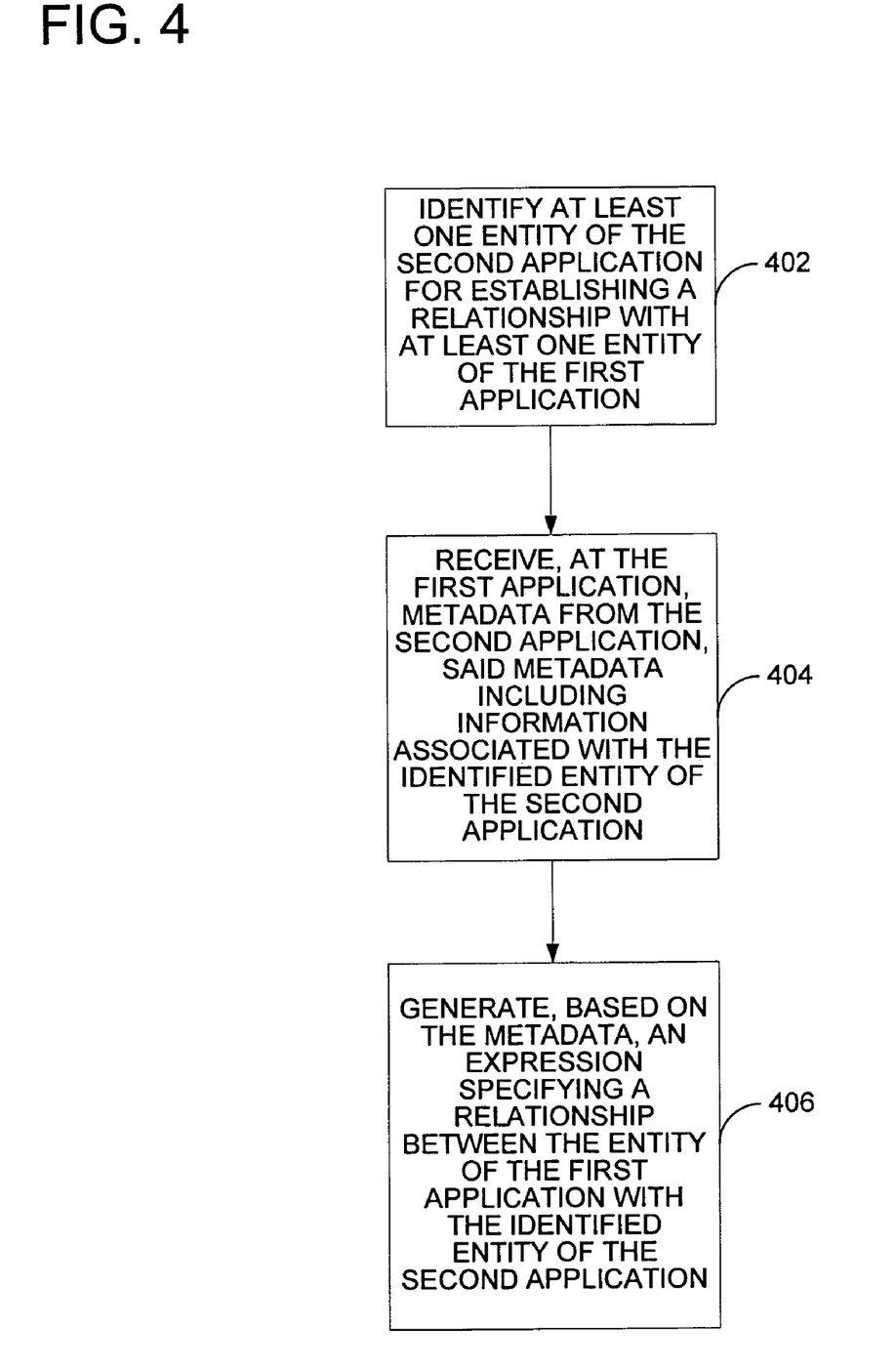
FIG. 4 is a flow chart illustrating an exemplary method of establishing relationships between one or more entities of a first application and one or more entities of a second application according to an embodiment of the invention.

FIG. 4 is a flow chart illustrating an exemplary method for establishing relationships between one or more entities of a first application and one or more entities of a second application. Initially, at 402, the user 108 identifies at least one entity of the second application for establishing a relationship with at least one entity of the first application. For example, the user 108 may create or define a task associated with one or more entities (e.g., customers, products, or the like). At 404, metadata is received at the first application from the second application, and the metadata includes information associated with the identified entity of the second application. At 406, an expression is generated, based on the metadata, specifying a relationship between the entities of the first application with the identified entity of the second application. In one embodiment, the generated expression is provided to the user 108 via interface 106.

Figure 5:
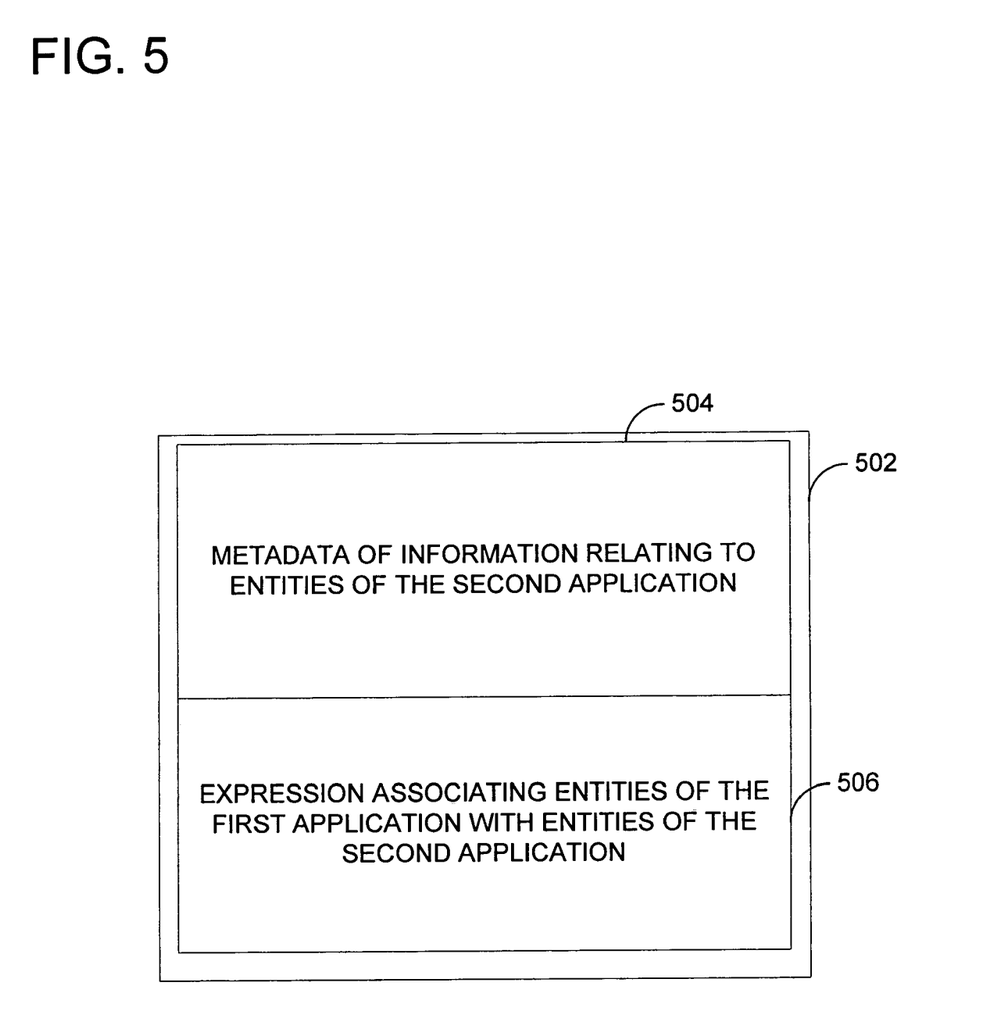
FIG. 5 is a block diagram illustrating an exemplary computer-readable medium on which the invention may be stored according to an embodiment of the invention.

FIG. 5 illustrates one embodiment of a computer-readable medium 502 having stored thereon a data structure for establishing relationships between one or more entities of a first application and one or more entities of a second application. A first data field 504 includes metadata representing information associated with the one or more entities defined by the second application. For example, the first data field 504 may include business role information such as entity access information, entity privilege information, or the like. A second data field 506 includes metadata representing an expression that specifies a relationship associating one or more entities of the first application with the one or more entities of the second application based on the metadata of the first data field 504. For example, the expression included in the second data field 506 may be "product.customer.region.regionalmanager.manager.manager.manager" as described in FIG. 3A.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage medium and communication media. Computer storage mediums include volatile and nonvolatile, removable and non-removable storage media implemented in any method or technology for storage of information such as computer readable instructions, data structures, program modules or other data. For example, computer storage mediums include RAM, ROM, EEPROM, flash memory or other memory, CD-ROM, digital versatile disks (DVD) or other optical disk storage, magnetic cassettes, magnetic tape, magnetic disk storage or other magnetic storage devices, or any other storage medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer-device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connection shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a Web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 4. For example, computer 130 is configured to execute a computerized method of establishing relationships between one or more entities of a first application and one or more entities of a second application. At least one entity of the second application is identified for establishing a relationship with at least one entity of the first application. Metadata from the second application is received at the first application is received. The metadata includes information associated with the identified entity of the second application. An expression is generated, based on the metadata, specifying a relationship between the entities of the first application with the identified entity of the second application.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above system and method without departing from the scope of the invention, it is intended that all matter contained in the above description and shown in the accompanying drawings shall be interpreted as illustrative and not in a limiting sense.

What is claimed is:

1. A computerized method of establishing relationships between one or more entities of a workflow application and one or more entities of a customer relationship management (CRM) application, said computerized method comprising:

receiving a request from a user input for designing a workflow process to perform an action on an entity of the workflow application, said workflow process defining a hierarchical structure for processing the entity, said workflow application being executable by a processor, said CRM application being executable by another processor, said workflow application lacking prior knowledge for interacting with the one or more entities of the CRM application;

identifying at least one entity of the CRM application for establishing a relationship with the entity of the workflow application in response to the workflow process in the received request;

generating, at the CRM application, metadata from non-hierarchical CRM application information associated with the at least one identified entity of the CRM application, wherein the generated metadata defines an interaction structure that fits the at least one identified entity of the CRM application to the defined hierarchical structure of the workflow application for processing the entity in the workflow process based on the metadata without specifying a specific workflow expression for processing the workflow process, said interaction structure including at least the following information: role access permission, role access privileges, role type, role limitations, role-to-role relationships, business role information, business entity information, information pertaining to a business entity hierarchy, and information pertaining to a relationship graph;

receiving, at the workflow application, the generated metadata from the CRM application; and dynamically generating, based on the generated metadata, a workflow expression for the user to be processed in the workflow process between the entity of the workflow application and the identified entity of the CRM application to perform the action, said generating comprising identifying the business role information and the business entity information of the identified entity of the CRM application and associating the identified information with the entity of the workflow application.

2. The computerized method of claim 1 wherein the metadata includes information relating to relationships among the one or more entities of the CRM application.

3. The computerized method of claim 1 wherein the generated workflow expression includes one or more limitations imposed on at least one of the relationships among the one or more entities of the CRM application.

4. The computerized method of claim 3 further comprising applying the one or more limitations associated with specified relationship in the generated workflow expression such that the one or more entities of the CRM application are correlated to the one or more entities of the workflow application.

5. The computerized method of claim 1 further comprising receiving a user input for defining new relationships between the one or more entities of the workflow application and one or more entities of the CRM application based on the obtained metadata.

6. The computerized method of claim 1 wherein one or more computer-readable media include computer-executable instructions for performing the computerized method recited in claim 1.

7. A system of establishing relationships between one or more entities of a first application and one or more entities of a second application, said system comprising:
  a memory;
  the first application, said first application being a workflow application;
  the second application, said second application being a customer relationship management (CRM) application;
  an interface for receiving a request from a user input for designing a workflow process to perform an action on an entity of the first application, said workflow process defining a hierarchical structure for processing the entity, said first application lacking prior knowledge for interacting with the one or more entities of the second application;
  a processor for executing computer-executable instructions for:
    identifying the one or more entities of the second application for establishing a relationship with the one or more entities of the first application in response to the workflow process in the received request;
    generating, at the second application, metadata from non-hierarchical second application information associated with the one or more identified entities of the second application, wherein the generated metadata defines an interaction structure that fits the at least one identified entity of the second application to the defined hierarchical structure of the first application for processing the entity of the workflow process based on the metadata without specifying a specific workflow expression for processing the workflow process, said metadata including information relating to at least one of the following associated with one or more entities of the second application: business role information and business entity information;
  wherein the interface receives the generated metadata for the first application from the second application; and
  wherein the processor dynamically generates, based on the generated metadata, a workflow expression for the user to be processed in the workflow process between the one or more entity of the first application and the one or more identified entities of the second application to perform the action, wherein the processor identifies the business role information and the business entity information of the identified entity of the CRM application and associating the identified information with the entity of the workflow application.

8. The system of claim 7 wherein the processor is configured to identify the business role information and business entity information of the one of the entities of the second application and associating the identified information with the entity in the first application for generating the workflow expression.

9. The system of claim 7 wherein the generated workflow expression includes one or more limitations imposed on at least one of the relationships among the one or more entities of the second application.

10. The system of claim 9 wherein the processor is configured to apply the one or more limitations associated with specified relationship in the generated expression such that the one or more entities of the second application are correlated to the one or more entities of the first application.

11. The system of claim 7 wherein the metadata includes information specifying relationships among the one or more entities of the second application.

12. The system of claim 7 wherein the interface further receives a user input for defining new relationships between the one or more entities of the first application and the one or more entities of the second application based on the obtained metadata.

13. The system of claim 7 wherein the first application is a workflow management application specifying one or more tasks and wherein the second application includes one or more entities indicating performance of the one or more specified tasks.

14. A computer storage medium having stored thereon a data structure for establishing relationships between one or more entities of a first application and one or more entities of a second application, said first application being a workflow application, said second application being a customer relationship management (CRM) application, said computer storage medium comprising:
  a first data field including metadata, said metadata being generated, by the second application, from non-hierarchical CRM application information associated with the one or more entities of the second application, wherein the generated metadata defines an interaction structure that fits the one or more entities of the second application into a hierarchical structure of the one or more entities of the first application for processing the one or more entities of the first application in a workflow process based on the metadata without specifying a specific workflow expression for processing the workflow process, said first application lacking prior knowledge for interacting with the one or more entities of the second application, said metadata in the first data field includes information relating to at least one of the following associated with the one or more entities of the second application: business role information, and business entity information; and
  a second data field including metadata representing an expression, based on the generated metadata by the second application, to be processed in the workflow process specifying a relationship associating one or more entities of the first application with the one or more entities of the second application based on the metadata of said first data field, said specified relationship in the expression defining a proper role to perform an action on an entity of the first application such that a user can use the generated expression to interact with the second application, said represented expression identifying the business role information and the business entity information of the identified entity of the CRM application and associating the identified information with the entity of the workflow application.

15. The computer storage medium of claim 14 wherein the metadata in the first data field includes information relating to relationships among the one or more entities of the second application, and wherein the expression in the second data field includes one or more limitations imposed on at least one relationships among the one or more entities of the first application.

* * * * *